United States Patent
Helmstädter et al.

(10) Patent No.: US 6,236,935 B1
(45) Date of Patent: May 22, 2001

(54) NAVIGATION-ASSISTANCE METHOD AND DEVICE FOR A VEHICLE DRIVER

(75) Inventors: Gerald Helmstädter, Frankfurt; Kai Schmischke, Neuberg, both of (DE)

(73) Assignee: Mannesmann Vdo AG (DE)

( * ) Notice: Subject to any disclaimer, the term of this patent is extended or adjusted under 35 U.S.C. 154(b) by 0 days.

(21) Appl. No.: 09/269,238

(22) PCT Filed: Sep. 24, 1997

(86) PCT No.: PCT/EP97/05226

§ 371 Date: Aug. 3, 1999

§ 102(e) Date: Aug. 3, 1999

(87) PCT Pub. No.: WO98/13666

PCT Pub. Date: Apr. 2, 1998

(30) Foreign Application Priority Data

Sep. 25, 1996 (DE) .............................. 196 39 326

(51) Int. Cl.⁷ .................................................... G06F 7/00
(52) U.S. Cl. ................................ 701/205; 701/300
(58) Field of Search ............................. 701/200, 205, 701/206, 207, 208, 213, 214, 300; 340/990, 995

(56) References Cited

U.S. PATENT DOCUMENTS

| 4,774,672 | 9/1988 | Tsunoda et al. | 701/208 |
| 5,541,845 | 7/1996 | Klein | 701/207 |

FOREIGN PATENT DOCUMENTS 0601712 9/1993 (EP) .

Primary Examiner—William A. Cuchlinski, Jr.
Assistant Examiner—Edward Pipala
(74) Attorney, Agent, or Firm—Richard A. Speer; Mayer Brown & Platt

(57) ABSTRACT

The invention concerns a navigation-assistance method and a device for a vehicle driver, to which instructions obtained by comparing the itinerary predetermined by course-guiding points with every established position of the vehicle are given. The information to be passed on to the driver concerning deviations from the predetermined itinerary are controlled continuously or almost continuously by comparing the deviation variables from the predetermined itinerary with the variables obtained regarding the established positions of the vehicle.

17 Claims, 1 Drawing Sheet

NAVIGATION-ASSISTANCE METHOD AND DEVICE FOR A VEHICLE DRIVER

BACKGROUND OF THE INVENTION

The invention relates to a method and a device for the destination guidance assistance of a vehicle driver, to whom instructions are issued, which are derived from a comparison of a route predetermined by route guide points and of vehicle positions determined in each case.

Destination guidance systems lead the vehicle driver actively to his selected destination. For this purpose, the vehicle driver is given situation-dependent information on the route segment which still remains. This information is based, as a rule, on the current position of the vehicle, which is determined for example, via a satellite navigation system, and on additional information, such as direction, speed, change of direction, etc. From these particulars, instructions, such as, for example, "turn off to the right after 100 meters, can be issued to the vehicle driver as a result of the comparison with the entered or predetermined route. If the vehicle driver does not follow the instructions or, for example, turns off the required course without any instruction, a so-called "false trip" occurs.

Recognition of whether a false trip has occurred, on the one hand, is in any case necessary for the vehicle driver's information and, on the other hand, is required in order, if appropriate, to calculate a new route to the destination. False trips of this kind can be recognized from the fact that, for example, the current position of the vehicle deviates from the predetermined route by more than a predetermined tolerance or that a predetermined direction change angle is not adhered to when the vehicle turns off. However, devices for determining the position and for measuring a direction change angle and other variables describing the actual route fundamentally have measuring errors. As a result of a threshold value comparison of these variables, information reduction, in which only the statement "deviation" or "no deviation" remains, is carried out for display or for further evaluation.

BRIEF SUMMARY OF THE INVENTION

The object of the present invention is, in a method and a device for the destination guidance assistance of a vehicle driver, essentially to avoid this information reduction.

In the method according to this invention continuous or quasi continuous deviation dimensions from the predetermined route, provide information, also to be issued to the vehicle driver, which information is derived by comparison between variables describing the predetermined route and variables obtained in each case from the determined positions of the vehicle.

The advantage of the method according to this invention is that information relating to the size of the deviation, which information ultimately also represents the probability of a false trip, is available to the vehicle driver or for further processing.

In an advantageous embodiment of the method according to this invention, a variable describing the predetermined route has an extreme value on the straight center line between the route guide points and values which increase or decrease at a predetermined gradient as a function increasing distance from the straight line. The deviation dimension corresponds to the variable describing the predetermined route, at the determined position of the vehicle. At the same time, there is preferably provision for the variable describing the predetermined route to have a maximum on the straight line and to become zero at predetermined distances from the straight line.

By means of this embodiment of the invention, a kind of corridor is defined between two route guide points in each case, the edges of the corridor ultimately being indistinct and depending on the gradient and on the subsequent information processing. Thus, for example, in a digital road map it is possible for every path between two route guide points to store a gradient of the variable describing the predetermined route, which gradient is adapted to the actual course of the road linking the route guide points. If a road link between two route guide points is straight, such a corridor needs to take into account only the abovementioned measuring errors. A nonstraight course of the road is taken into account, in addition to the measuring errors, in the gradient or the width of the corridor.

In a further advantageous design of the method according to the invention, a variable describing the predetermined route describes a vehicle movement taking place opposite to the destination direction. In this situation the deviation dimension corresponds to the variable describing the predetermined route. This takes into account the fact that a false trip is highly improbable in the case of slight movements opposite to the destination direction, since such movements may occur, for example, on an S-bend of the road within the corridor. However, the same rearward movement may be a sign of a false trip if it takes place in an edge region of the corridor.

In another advantageous embodiment, a variable describing the predetermined route has an extreme value at the predetermined value of a turn-off angle at a route guide point and changes at a predetermined gradient with an increasing deviation from the angle. The deviation dimension corresponds to the variable describing the predetermined route, in the case of a determined turn-off angle of the vehicle. At the same time, there is preferably provision, in the case of the predetermined angle, for the variable describing the predetermined route to have a maximum and to fall to zero up to predetermined angular deviations.

This embodiment serves primarily for recognizing a false trip at route guide points. It is perfectly possible, however, according to this embodiment, to recognize a false trip even in the course of a road between two route guide points, if, for example, a turn-off angle is measured, although the road is straight or has a slight curve.

If there is only one deviation dimension, this may be indicated to the vehicle driver in a suitable way. If a plurality of deviation dimensions are derived, the invention, provides for comparing a plurality of deviation dimensions, derived from various variables describing the predetermined route, with a threshold value in each case and for logically interlinking the signals obtained from this comparison.

In another modification, a plurality of deviation dimensions derived from various variables describing the predetermined route are added and the sum obtained is compared with a threshold value. At the same time, there is preferably provision for assessing each of the deviation dimensions by means of a predetermined factor prior to addition.

Which of the abovementioned methods is used depends, in particular, on the set object.

In another modification of the method according to the invention, in order to determine a false trip at a turn-off point, the difference between a deviation dimension in the case of a correct vehicle trip and a deviation dimension obtained with the aid of the determined vehicle position is formed, and the difference is compared with a predetermined threshold value. This development contributes to recognizing a false turn-off at an early stage, even when there has not or not yet been a direct check of the turn-off angle.

Finally, in the method according to the invention, there may be provision for carrying out an assessment of the deviation dimensions, including the preceding individual manner of driving of the vehicle driver and/or of the vehicle.

In a device according to the invention, the object is achieved in that a computer is connected to at least a position sensor, a road map, a memory and input and display devices, and in that the computer operates according to a program, by means of which, for information, also to be issued to the vehicle driver, relating to deviations from the predetermined route, continuous or quasi continuous deviation dimensions are derived by comparison between variables describing the predetermined route and variables obtained in each case from the determined positions of the vehicle.

Advantageous developments and improvements of the device according to the invention are possible as a result of the measures listed in the further subclaims.

BRIEF DESCRIPTION OF THE DRAWINGS

The invention permits numerous embodiments. One of these is illustrated diagrammatically in the drawing by means of several figures and is described below. In the drawings.

DETAILED DESCRIPTION OF THE INVENTION

Figures 1, 2:
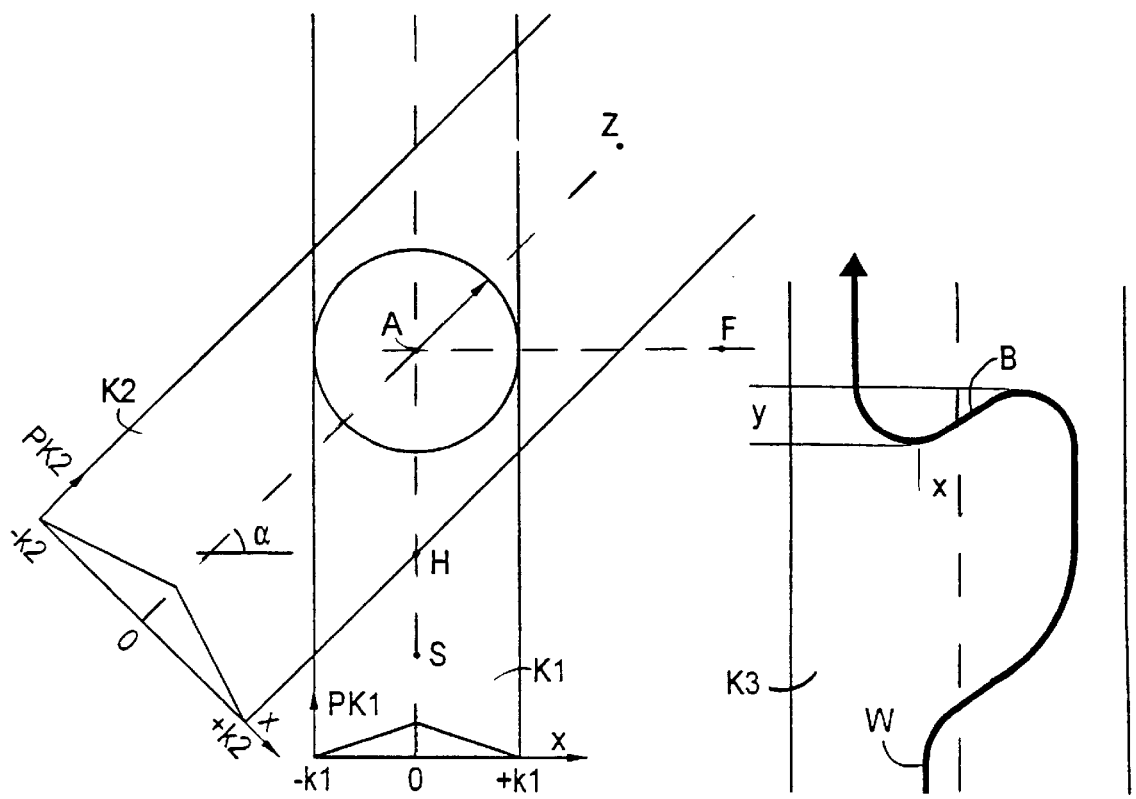
FIG. 1 shows a diagrammatic illustration of two corridors which form an angle with one another and lead respectively to and away from a route guide point.
FIG. 2 shows the course of a road within a corridor.

In the illustration according to FIG. 1, it is assumed that a calculated route leads from a starting point S by way of a route guide point A to a point Z, the destination. For the route segment from S to A there is a corridor K1 and for the route segment from A to Z there is a corridor K2. In the example illustrated, the corridors form an angle, but they may fundamentally also run in the same direction. Furthermore, the run of the deviation dimensions PK1 and PK2 is different, so that an imaginary width, which is given by the zero points of PK1 and PK2, is greater for the corridor K2 than for the corridor K1.

Since the deviation dimensions ultimately also represent a statement as to the probability with which the vehicle is located in the respective corridor, deviation dimensions are also designated below as corridor probabilities.

The following applies to the respective corridor probability:

$PK=(x+k) \cdot 0.5/k$ for $-k \leq x \leq 0$, $PK=0.5-(x \cdot 0.5/k)$ for $0 \leq x \leq k$, and $PK=0$ for values of x lying outside these ranges. In this case, k is the width of the respective corridor.

In order to determine the probability with which the vehicle is located at the route guide point A, the sum of the two probabilities $\Sigma P=PK1+PK2$ is formed. This sum probability is 0.5 up to the subsidiary point H and rises to 1 up to the point A.

For a vehicle which has left point A correctly in the direction Z, for a distance $r=k1$ there is a sum probability of $Pcorr=PK1+PK2=0.5-(R \cdot 0.5/k1) \cdot \cos \alpha+0.5=1-0.5 \cdot \cos \alpha$.

For a vehicle which has left point A in the direction of point F, that is to say is on a false trip, for the distance $r=k1$ there is a sum probability of $Pfalse=0.5-r \cdot (0.5/k2) \cdot \sin \alpha=0.5-0.5 \cdot \sin \alpha \cdot r/k2$.

If it is assumed below, for the sake of simplification, that $k1=k2$ and that $\alpha=45°$, $Pcorr=1-0.707 \cdot 0.5$ and $Pfalse=0.5-0.07 \cdot 0.5$ are obtained. The difference in the sum probabilities can therefore be used as a measure of the probability that the route guide point A will be left correctly. This becomes even clearer if additional factors are taken into account, such as, for example, the probability of a correct departure angle.

In the exemplary embodiment according to FIG. 2, a route W runs within a corridor K3 which, like the corridors in the illustration according to FIG. 1, is characterized by a probability, the value of which is highest at the center line of the corridor K3 and decreases to 0 as far as the edges. When a vehicle travels the route W in the direction of the arrow, the vehicle briefly moves away from its destination by the distance y at the point B along the route W. This distance may likewise be assigned a probability which is lower, the greater y becomes. There are therefore two probabilities available, which, in a similar way to the exemplary embodiment according to FIG. 1, may be combined into a sum probability. The effect is then such that, with an increasing distance x, that is to say with decreasing probability that the vehicle is located within the corridor K3, smaller distances y already contribute to recognizing a false trip.

Figure 3:
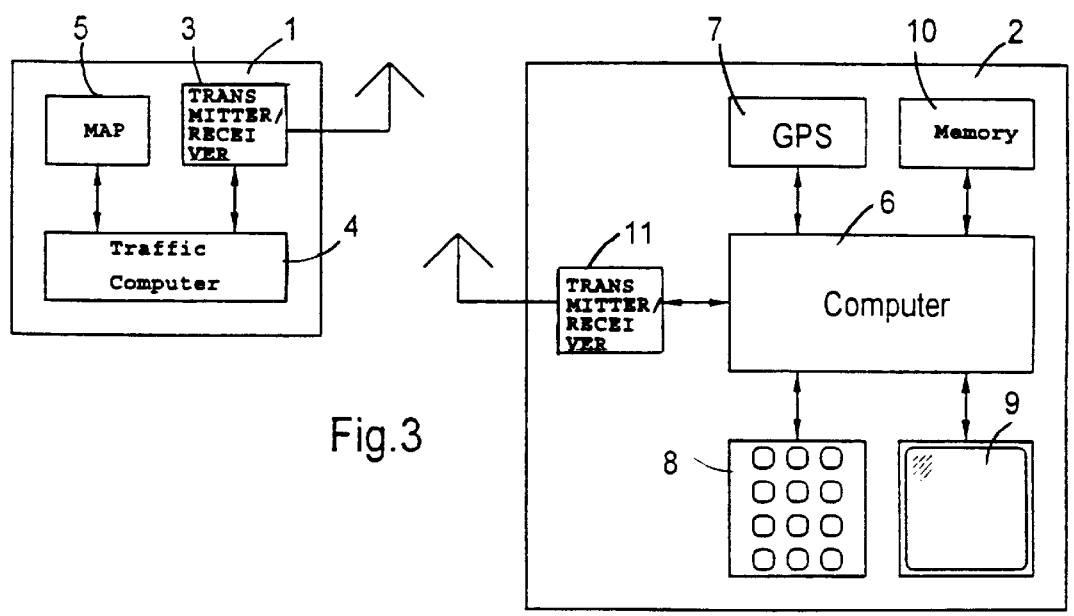
FIG. 3 shows a block diagram of a device according to the invention.

The exemplary embodiment, illustrated as a block diagram in FIG. 3, of a device according to the invention consists of a vehicle unit 2 and of a central device 1, between which there is a radio link, for example according tot he GSM standard, in each case with a transmitter/receiver 3, 11. Located in the central device 1 is a traffic computer 4 which has access to a stored road map 5 and determines the route for a large number of vehicles.

The vehicle unit 2 consists essentially of an on-board computer 6, a GPS receiver 7, an input device 8, a display device 9 and a memory 10. These components are known per se and need not be explained in any more detail in order to understand the invention. The GPS receiver 7 constantly feeds information on the geographic position of the vehicle to the on-board computer 6. The direction of movement and the speed of the vehicle can also be derived by differentiation. If required, further sensors, for example wheel sensors, may also be used.

The vehicle driver can enter a destination by means of the input device 8. This destination is fed, together with the current position, to the traffic computer 4 which determines the desired route by means of the road map 5 and transmits it in the form of a route guide point list to the vehicle unit 2. Moreover, in order to carry out the method according to the invention, the profile of the corridor probabilities and the profile of the probabilities regarding the rearward movements are transmitted to the vehicle unit 2 for the routes between the route guide points, and turn-off angles, including their probabilities, are transmitted to the vehicle unit 2 for the individual route guide points. These data are stored in the vehicle unit 2 and are used in the computer 6 for carrying out the method steps described above.

What is claimed is:

1. A method for the destination guidance assistance of a vehicle driver, to whom instructions are issued, comprising the steps of:

deriving instructions for a vehicle driver from a comparison of information which defines predetermined route guide point locations with information which defines actual vehicle locations;

comparing variables describing the predetermined route guide point locations to variables obtained from predetermined vehicle locations to obtain information representing individual probabilities of a false trip;

and logically interlinking and comparing the individual false trip probabilities to a threshold value, or summing the individual false trip probabilities and comparing the summed value to a threshold value.

2. The method as claimed in claim 1, wherein a variable describing the predetermined route has an extreme value on a straight line between the route guide points and increases or decreases at a predetermined gradient with an increasing distance from the straight line, and wherein the probability of a false trip corresponds to the variable describing the predetermined route, at the determined position of the vehicle.

3. The method as claimed in claim 2, wherein the variable describing the predetermined route has a maximum value on the straight line and becomes zero at predetermined distances from the straight line.

4. The method as claimed in claim 1, wherein a variable describing the predetermined route describes a vehicle movement taking place opposite to the destination direction, and wherein the probability of a false trip corresponds to the variable describing the predetermined route, in the case of a determined vehicle movement opposite to the destination direction.

5. The method as claimed in claim 2, wherein a variable describing the predetermined route has an extreme value at the predetermined value of a turn-off angle at a route guide point and changes at a predetermined gradient with an increasing deviation from the angle, and wherein the probability of a false trip corresponds to the variable describing the predetermined route, in the case of a determined turn-off angle of the vehicle.

6. The method as claimed in claim 5, wherein the extreme value of the variable describing the predetermined route has a maximum value at the predetermined angle and decreases to zero at predetermined angular deviations.

7. The method as claimed in claim 1, wherein the probabilities of a false trip are each assessed by means of a predetermined factor prior to addition.

8. The method as claimed in claim 1 or 5, wherein, in order to determine a false trip at a turn-off point, the difference between a probability of a false trip in the case of a correct vehicle trip and a probability of a false trip obtained with the aid of the determined vehicle position is formed, and wherein the difference is compared with a predetermined threshold value.

9. The method as claimed in claim 1 or 7, wherein an assessment of the probabilities of a false trip, including the preceding individual manner of driving of the vehicle is carried out.

10. A device for the destination guidance assistance of a vehicle driver, to whom instructions are issued comprising a computer 6 connected to at least a position sensor 7, a road map 5, a memory 10 and input and display devices 8, 9 wherein the computer 6 is programmed to derive instructions for a vehicle driver from a comparison of information which defines predetermined route guide point locations with information which defines actual vehicle locations and to compare variables describing the predetermined route guide point locations to variables obtained from determined vehicle locations to obtain information representing individual probabilities of a false trip and logically interlinking and comparing the individual false trip probabilities to a threshold value, or summing the individual false trip probabilities and comparing the summed value to a threshold value.

11. The device as claimed in claim 10, wherein a variable describing the predetermined route has an extreme value on a straight line between the route guide points and increases or decreases at a predetermined gradient with an increasing distance from the straight line, and wherein the probability of a false trip corresponds to the variable describing the predetermined route, at the determined position of the vehicle.

12. The device as claimed in claim 10, wherein a variable describing the predetermined route has a maximum on the straight line and becomes zero at predetermined distances from the straight line.

13. The device as claimed in one of claims 10 to 12, wherein a variable describing the predetermined route describes a vehicle movement taking place opposite to the destination direction, and wherein the probability of a false trip corresponds to the variable describing the predetermined route, in the case of a determined vehicle movement opposite to the destination direction.

14. The device as claimed in one of claims 10 to 12, wherein a variable describing the predetermined route has an extreme value at the predetermined value of a turn-off angle at a route guide point and changes at a predetermined gradient with an increasing deviation from the angle, and wherein the probability of a false trip corresponds to the variable describing the predetermined route, in the case of a determined turn-off angle of the vehicle.

15. The device as claimed in claim 10, wherein the extreme value of the variable describing the predetermined route has a maximum at the predetermined angle and decreases to zero at predetermined angular deviations.

16. The device as claimed in claim 10 wherein, the probabilities of a false trip are each assessed by means of a predetermined factor prior to addition.

17. The device as claimed in claim 10, wherein in order to determine a false trip at a turn-off point, the difference between a probability of a false trip in the case of a correct vehicle trip and a probability of a false trip obtained with the aid of the determined vehicle position is formed, and wherein the difference is compared with a predetermined threshold value.

* * * * *